United States Patent [19]
Morr

[11] 3,872,568
[45] Mar. 25, 1975

[54] SHORT STROKE DYNAMOELECTRIC MACHINE COIL AND WEDGE INSERTING APPARATUS

[75] Inventor: Charles W. Morr, Fort Wayne, Ind.
[73] Assignee: Essex International, Inc., Fort Wayne, Ind.
[22] Filed: Apr. 17, 1974
[21] Appl. No.: 461,612

[52] U.S. Cl.............................. 29/205 D, 29/205 E
[51] Int. Cl...................... H02k 15/06, H02k 15/08
[58] Field of Search.......... 29/205 D, 205 E, 205 R, 29/596

[56] References Cited
UNITED STATES PATENTS

| | | | |
|---|---|---|---|
| 2,432,267 | 12/1947 | Adamson | 29/596 |
| 3,377,690 | 4/1968 | Eminger | 29/205 R |
| 3,402,462 | 9/1968 | Walker et al. | 29/596 |
| 3,447,225 | 6/1969 | Eminger | 29/205 D |

Primary Examiner—Thomas H. Eager

[57] ABSTRACT

Apparatus for inserting prewound coils and slot wedges into the slots of an internally slotted dynamoelectric machine stator core member. The apparatus includes wedge pushing elements actuated by a hydraulic ram. A group of wedges is pushed by the pushing elements from a magazine into wedge guides by a stroke of the ram into stator slots.

More specifically and alternatively, the apparatus includes first and second axially spaced wedge pushing elements actuated by a hydraulic ram. A first group of wedges is pushed by the first pushing element from a magazine into wedge guides by a stroke of the ram, and the first group of wedges is pushed by the second pushing element from the wedge guides into stator slots, as a second group of wedges is pushed from the magazine into the wedge guides by the next stroke of the ram.

17 Claims, 8 Drawing Figures

SHORT STROKE DYNAMOELECTRIC MACHINE COIL AND WEDGE INSERTING APPARATUS

BACKGROUND OF THE INVENTION

1. Field of the Invention

This invention relates generally to apparatus for inserting or injecting prewound coils and flat wedges into the slots of an internally slotted dynamoelectric machine core member.

2. Description of the Prior Art

Apparatus for inserting prewound coils into the slots of a dynamoelectric machine stator core member is shown in U.S. Pat. No. 2,432,267, and coil inserting apparatus which also inserts slot wedges into the stator slots following insertion of the coils is further shown in U.S. Pat. Nos. 3,402,462, 3,377,690 and 3,447,225, the latter two patents being assigned to the assignee of the present application.

Such apparatus typically comprises a cylindrical array of elongated, spaced, parallel blade elements having distal ends which extend into the bore of the stator core member and engage the inner ends of the teeth, the axially extending spaces between the blades being in alignment with and communicating with the stator slots. Elongated wedge guide elements engage the rear portions of the blade elements and define wedge guide slots therebetween which are in axial alignment with the stator slots. A wedge guide magazine is disposed rearwardly of the wedge guides and has wedge slots therein which receive slot wedges to be inserted and which are respectively in alignment with the wedge guide slots defined by the wedge guide elements. Wedge making mechanism may be disposed adjacent the wedge magazine for forming wedges directly in the magazine slots as shown in U.S. Pat. No. 3,447,225.

The prewound coils are draped around certain of the blade elements and wedge guide elements with sides passing through respective spaces defined by adjacent blade and wedge guide elements, the stator core member is then positioned on the blade elements, and the coils are inserted into the slots by a stripper member which moves forwardly through the interior of the blade elements as described in the aforesaid U.S. patents. In prior coil insertion apparatus, the wedges have been pushed in a single, continuous movement, from the wedge magazine through the wedge guide slots and into the stator slots over the coil sides therein by elongated push rods actuated by the same hydraulic ram which actuates the stripper member, as shown for example in U.S. Pat. No. 3,447,225. Such single-stroke transfer and insertion of slot wedges has required the use of axially elongated, small cross-section push rods which axially pass through the magazine and wedge guide slots, the single-stroke movement of these push rods in turn requiring the use of a hydraulic ram having a correspondingly long stroke; such long push rods and ram have resulted in a machine having substantial overall length, the longstroke ram appreciably contributing to the overall cost of the machine. The lengths of the push rod and ram are accentuated in the case of apparatus for inserting coils and wedges in stator core members having a long stack length, such as stator core members for submersible pump motors, thus necessitating the use of additional means for supporting the push rods to prevent buckling thereof as shown in U.S. Pat. No. 3,377,690.

SUMMARY OF THE INVENTION

It is accordingly desirable to provide coil and slot wedge inserting apparatus of the type generally above-described which employes a substantially shorter wedge transfer and insertion stroke than has heretofore been required, and which eliminates the long wedge push rods and the apparatus to support and guide them heretofore employed.

The invention, in its broader aspects, provides first means for pushing the slot wedges forwardly from their initial location to a second location in the wedge guide slots are spaced rearwardly from the forward ends of the wedge guide elements. Second means is provided spaced axially forwardly from the first pushing means for pushing the slot wedges forwardly from the second location through the wedge guide slots into the stator core slots, and means is provided for moving the first and second pushing means forwardly simultaneously so that a first group of slot wedges are pushed from the second location into the stator core slots as a second group of slot wedges are pushed from their initial location to the second location.

In a preferred embodiment of the invention, the first pushing means comprises a member having pushing elements extending radially outwardly so as to enter the magazine and wedge guide slots thereby to push slot wedges therein, and the second pushing means comprises a member having a plurality of pushing elements mounted for radial movement inbetween retracted and protracted positions in which they extend into the wedge guide slots for pushing the slot wedges therein. A limited, lost-motion connection is provided between the mounting member of the second pushing means and the moving means and cooperating cam means is provided for biasing the movable pushing elements to their protracted positions during such limited forward lost-motion, the movable pushing elements being retained in their protracted positions during further forward movement of the moving means. Means are provided for biasing the movable pushing elements to their retracted positions during the limited rearward lost-motion movement and for retaining the movable pushing elements in their retracted positions during further rearward movement of the moving means. Thus, during a first forward movement or stroke of the moving means, the first or rear pushing elements push a first group of wedges from the magazine into the wedge guide slots to the first location, the second or forward pushing elements being protracted during the forward lost-motion movement and simultaneously moving forwardly in the wedge guide slots. During the rearward movement or stroke of the moving means, the forward pushing elements are retracted and move under the first group of slot wedges at the first location. During the next successive forward move or stroke of the moving means, the first or forward pushing elements are protracted into the wedge guide slots during the forward lost-motion movement and then push the first group of slot wedges from the second location in the wedge guide slots forwardly into the stator slots while the first or rear pushing elements simultaneously are pushing the second group of slot wedges from their initial location in the magazine to the second location in the wedge guide slots.

Also the slot wedges are transferred from the magazine and inserted in the stator slots in two successive strokes, rather than one, and thus the length of the ram can be reduced by upwards of one-half from the lengths previously required, and further, the employment of pushing elements which extend radially into the magazine and wedge guide slots eliminates the axially elongated wedge push rods previously employed.

It is accordingly an object of the present invention to provide improved dynamoelectric machine coil and wedge insertion apparatus.

Another object of the invention is to provide improved dynamoelectric machine coil and wedge insertion apparatus in which the length of the wedge insertion stroke is substantially reduced.

A further object of the invention is to provide improved dynamoelectric machine coil and wedge insertion apparatus in which the axially elongated wedge push rods previously employed are eliminated.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 6:
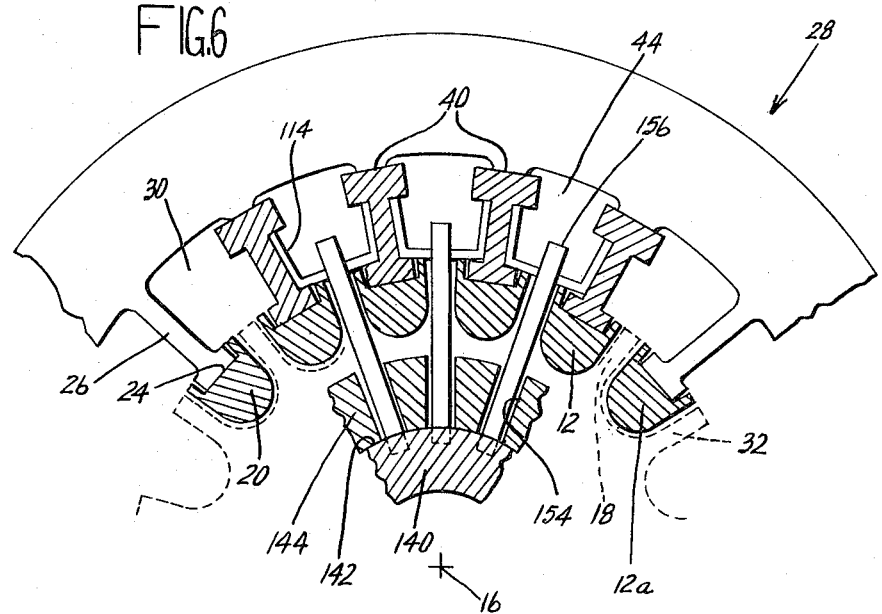
FIG. 6 is a fragmentary cross-sectional view taken generally along the line 6—6 of FIG. 1A and showing the front wedge pushing elements in their forwardmost positions.

Referring now to the figures of the drawings, the improved coil and wedge insertion apparatus of the invention, generally indicated at 10, comprises a plurality of elongated, parallel blade elements 12 spaced around bore 14 having axis 16 and defining axially and radially extending spaces 18 therebetween (FIG. 6). Blades 12 have distal ends 20, rear portions 22, and outer surfaces 24. Outer surfaces 24 of distal end portions 20 of blade elements 12 are adapted to engage the inner ends of teeth 26 of stator core member 28 which define slots 30 therebetween.

Stripper member 32 is adapted to be moved axially through bore 14 and bore 34 of stator core member 28 within blades 12 by push rod 36. Certain of blade elements 12, identified as 12a, have their rear portions 22 secured to stripper member 32, as by threaded fasteners 38, and move therewith through stator bore 34, while the remaining blade elements 12 are stationary. A plurality of elongated, parallel wedge guide elements 40 are provided respectively axially aligned with blade elements 12. Wedge guide elements are spaced about bore 42 coaxial with and communicating with bore 14, and define wedge guide slots 44 therebetween in axial and radial alignment with spaces 18 between blade elements 12 and in axial alignment with stator slots 30 (FIG. 6). Wedge guide slots 44 communicate with bore 42. Stationary blade elements 12 have their rear portions 22 secured to respective wedge guide elements 40, as by threaded fasteners 46. Forward ends 48 of wedge guide elements 40 respectively define distal end portions 20 of blade elements 12. Rear portions 50 of wedge guide elements 40 extend rearwardly from rear portions 22 of blade elements 12 and are secured to housing member 52, as by threaded fasteners 54.

Base plate member 56 is secured to housing 52, as by welding at 58, and has index gear 60 secured thereto, as by threaded fasteners 62. Index gear 60 is engaged by a pinion driven by an index drive motor (both not shown) and serves selectively to rotate or index the entire blade element, wedge guide element and housing assembly 64. Angular member 59 secured to base plate 56, as by threaded fastener 61, retains and locates wedge guide elements 40.

Figure 3:
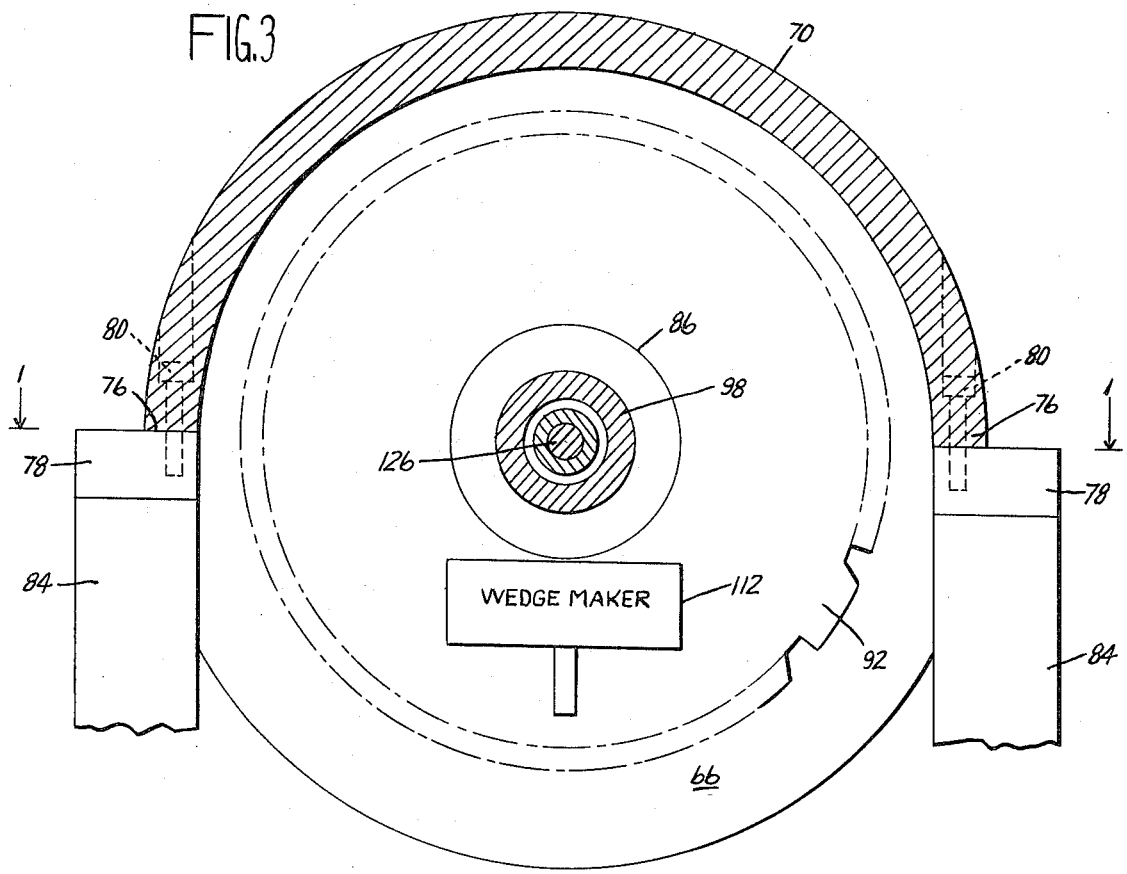
FIG. 3 is a cross-sectional view taken generally along the line 3—3 of FIG. 1B.

Index gear 60 and assembly 64 are rotatably mounted on plate member 66 by bearings 68. Semicylindrical wedge magazine and wedge marker housing 70 has its forward end 72 secured to plate member 66, as by threaded fastener 74. Side edges 76 of housing member 70 are supported on side rails 78 and secured thereto, as by threaded fasteners 80 (FIG. 3). Side rails 78 are secured to front plate 8, as by threaded fasteners 82, front plate 8 forming a part of the stationary supporting frame of the machine. Side rail 78 are also supported by frame members 84.

Wedge magazine 86 (FIGS. 1B and 3) is disposed within housing 70 and has its forward end 88 secured to hub portion 90 of indexing ratchet wheel 92, as by threaded fasteners 94. Ratchet wheel 92 is rotatably mounted on plate member 66 by bearings 96. Rear end 98 (FIGS. 1B and 3) of magazine member 86 is rotatably supported on rear support plate 100 by bearings 102. Rear support plate 100 is secured to the rear end of housing 70, as by threaded fasteners 104 (FIG. 2).

Wedge magazine 86 has central bore 106 formed therein coaxial with and communicating with bore 42. Wedge magazine 86 (FIGS. 1A and 1B) has axially extending wedge forming and guide slots 108 formed therethrough radially communicating with bore 106 and respectively in axial alignment with wedge guide slots 44 defined by wedge guide elements 40. Rear ends 110 of wedge guide elements 40 extend into central openings formed in hub 90 of index ratchet 92 and forward end 88 of wedge magazine 86 and are closely adjacent the forward ends of wedge guide slots 108.

Figure 4:
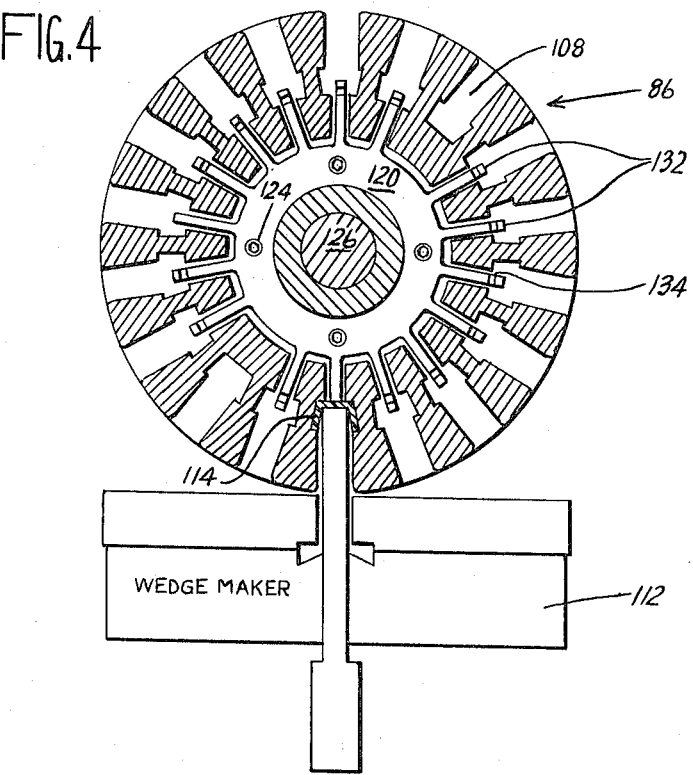
FIG. 4 is a fragmentary cross-sectional view taken generally along the line 4—4 of FIG. 1B.

Wedge making mechanism 112, (FIGS. 3 and 4), which may be of the type more fully shown and described in U.S. Pat. No. 3,447,225, may be provided for initially forming wedges 114 (FIGS. 4, 5, 6 and 7) in wedge magazine slots 108.

The apparatus thus far described is conventional and does not, except in combination, form a part of the present invention.

In accordance with the invention, tubular sleeve member 116 (FIG. 1B) is seated in bore 106 of magazine 86 for axial movement therein. Sleeve member 116 has central bore 118 formed therein. Rear wedge pushing member 120 is secured to rear end 122 of sleeve member 116, as by threaded fasteners 124, and is secured to piston rod 126 of hydraulic cylinder 128 mounted on rear mounting plate 100, as by threaded fasteners 130.

Rear pushing member 120 has pushing elements 132 formed thereon which extend radially outwardly into wedge guide slots 108 of magazine 86. Rear wedge pushing elements 132 have notches 134 formed therein for respectively engaging the rear ends of the bottom portions 136 of wedges 114.

Figure 1A:
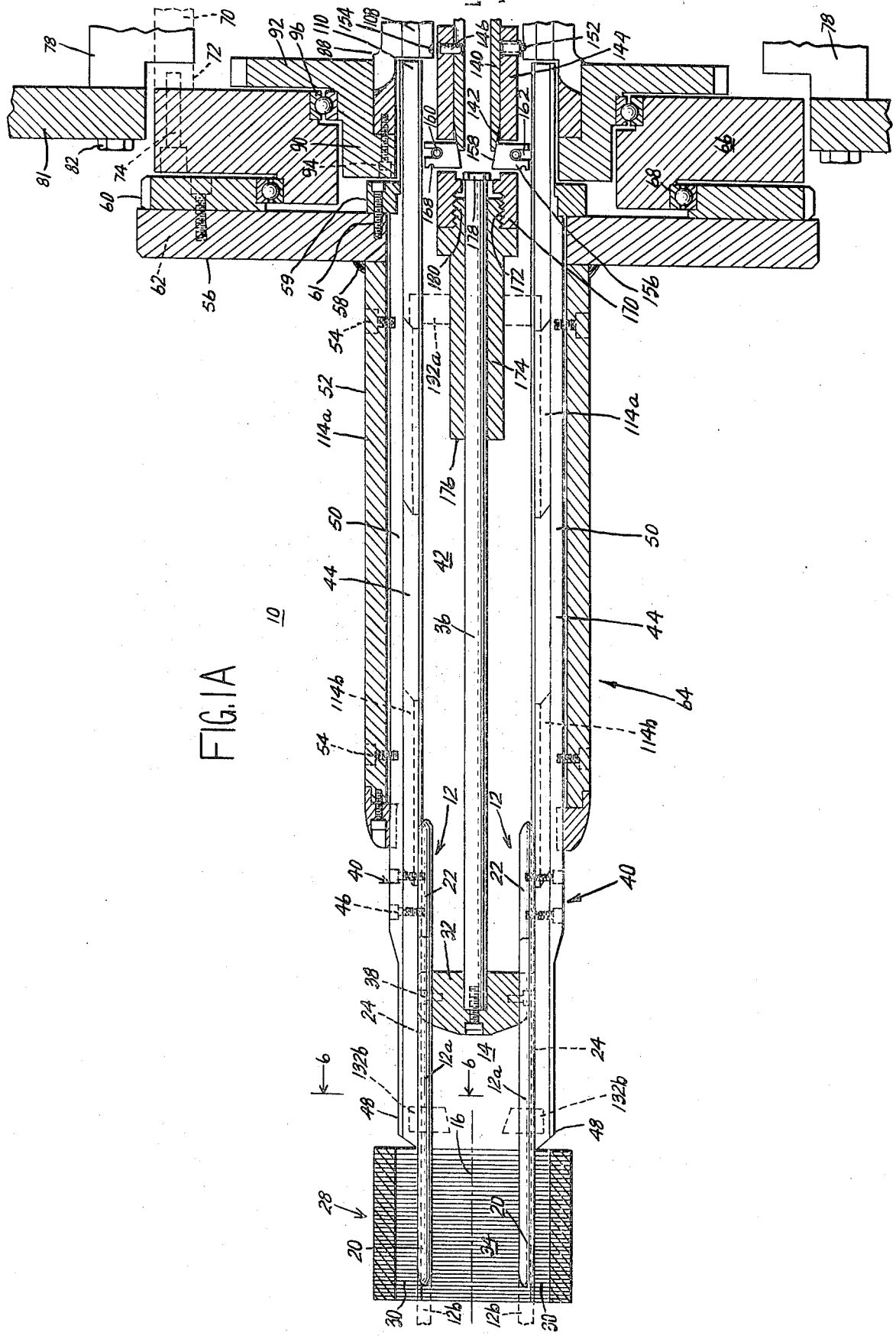
FIGS. 1A and 1B are top, longitudinal-sectional views showing the improved apparatus of the invention.
Figure 1B:
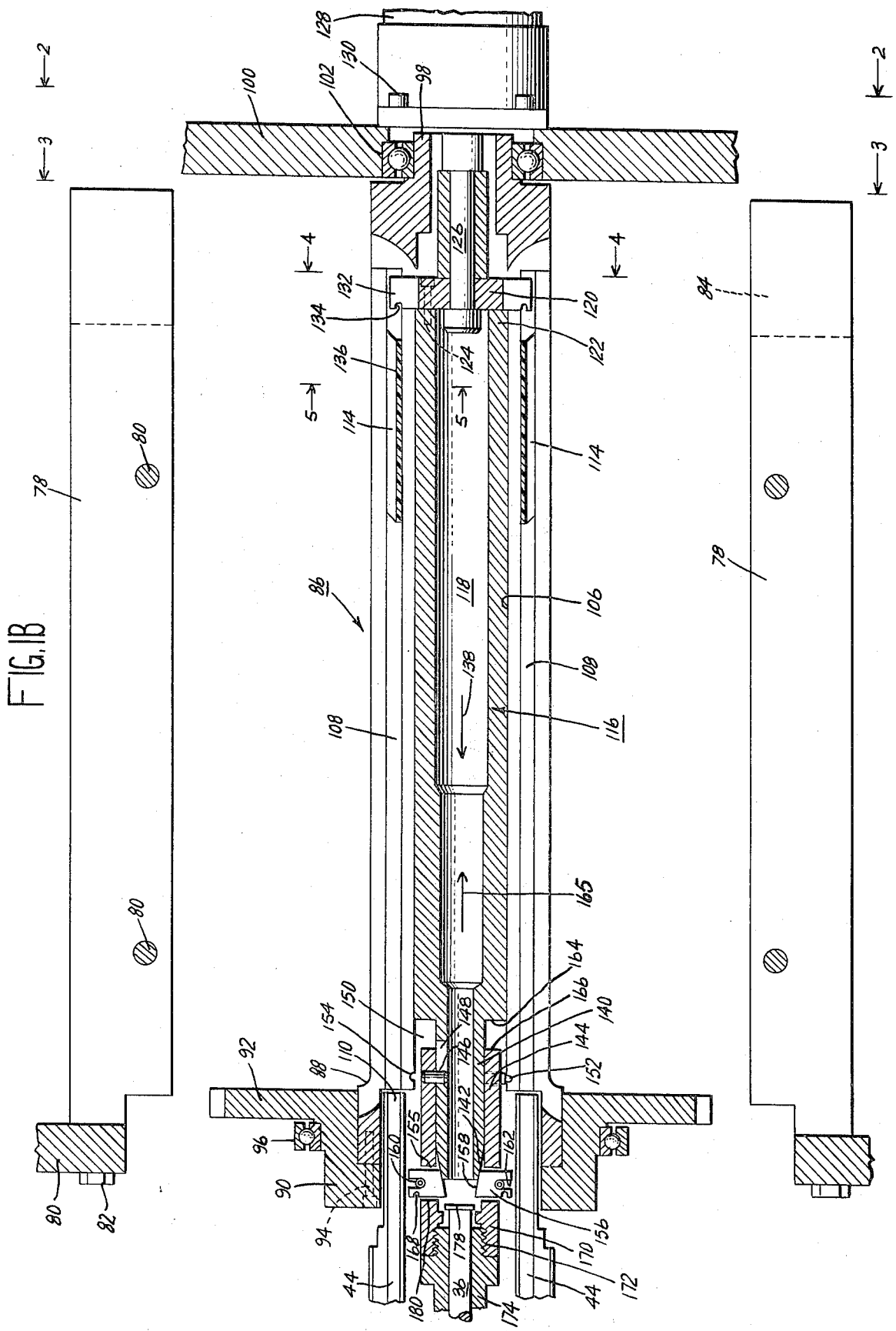
Figure 2:
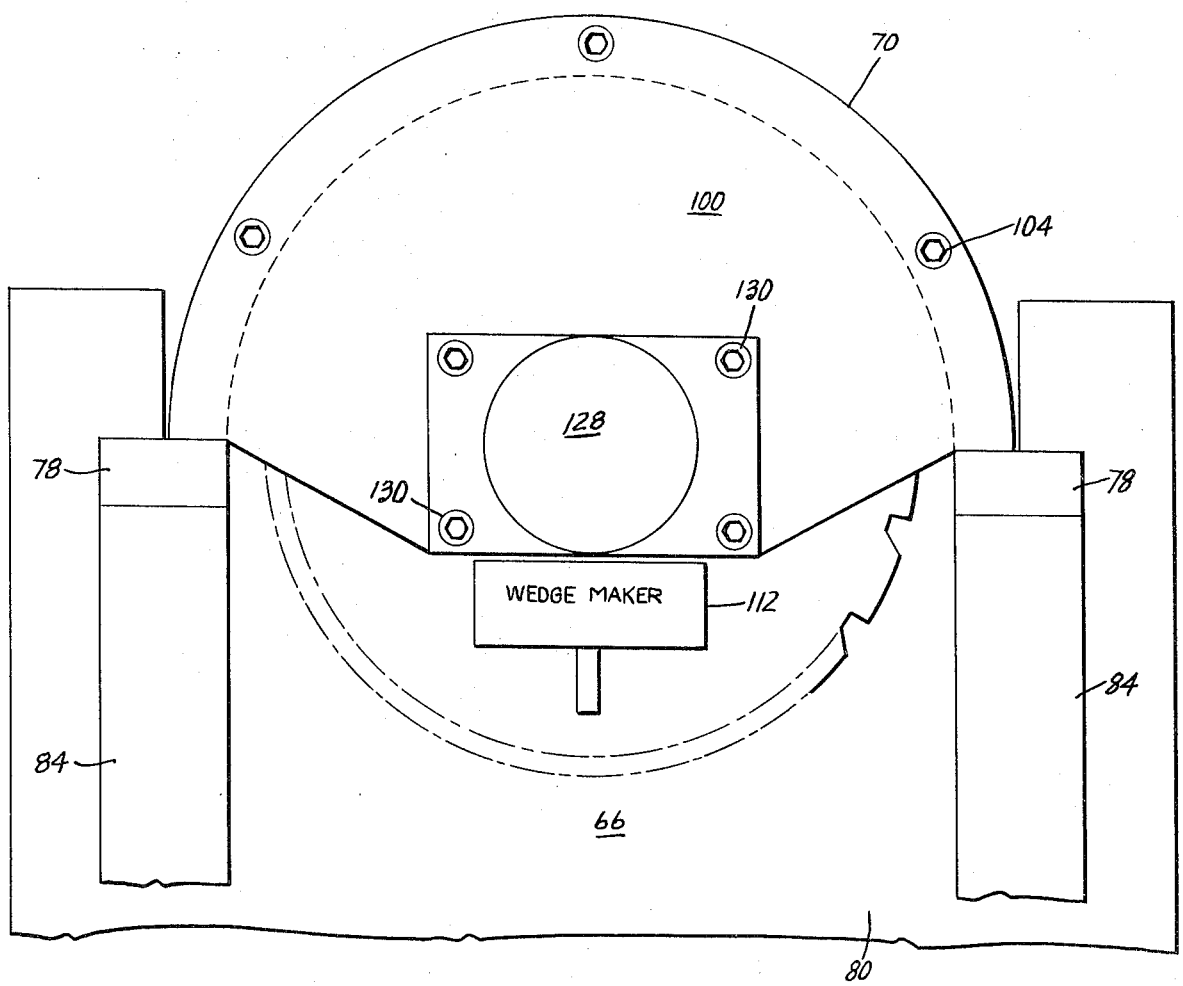
FIG. 2 is a rear end view of the apparatus as viewed generally along the line 2—2 of FIG. 1B.
Figure 5:
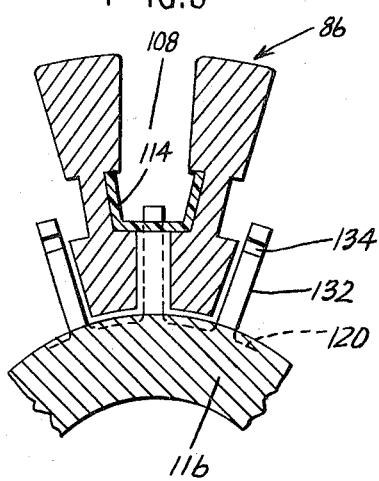
FIG. 5 is a fragmentary cross-sectional view taken generally along the line 5—5 of FIG. 1B.

The stroke of piston rod 126 of cylinder 128 is sufficiently long to move sleeve member 116 and rear wedge pushing member 120 axially forwardly in the direction shown by arrow 138 from the position shown in FIG. 1B to a position with rear pushing elements 132 extending into wedge guide slots 44 defined by wedge guides 40, as indicated in dashed lines at 132a in FIG. 1A, rear wedge pushing elements 130 moving axially forwardly in magazine slots 108 and then into and forwardly through wedge guide slots 44 thereby pushing wedges 114 from their initial location, as shown in FIG. 1B, to a second or intermediate location in wedge guide slots 44, as shown at 114a in FIG. 1A.

Sleeve member 116 has reduced-diameter front end portion 140 (FIGS. 1A, 1B, 7) having frusto-conical cam surface 142 on its front end. Front pushing element retaining member 144 is slidably mounted on front end portion 140 of sleeve member 116 and has a lost-motion connection therewith which includes two or more dowels 146 circumferentially spaced and seated in member 144 and slidably positioned in slot 148 in front end portion 140, thus providing limited lost-motion between sleeve member 116 and mounting member 144 on the rearward stroke, as indicated at 150. Two or more spring loaded ball plungers 152 are threaded into member 144 and seat in circumferential groove 154 in magazine 86 thereby to restrain forward movement of mounting member 144 during the lost-motion forward movement of sleeve member 116.

Mounting member 144 has a plurality of radially extending slots 155 formed therein. Radially extending forward wedge pushing elements 156 are movably seated in notches 155, and respectively have tapered inner edges 158 which engage cam surface 142 of front portion 140 of sleeve member 116. Front wedge pusher elements 156 are resiliently biased radially inwardly into engagement with cam surface 142 by garter spring 160 seated in notches 162. Angular groove 163 formed in the outer surface of member 144 (FIG. 7) accommodates garter spring 160 when forward pushing elements 156 are in their retracted positions.

Figure 7:
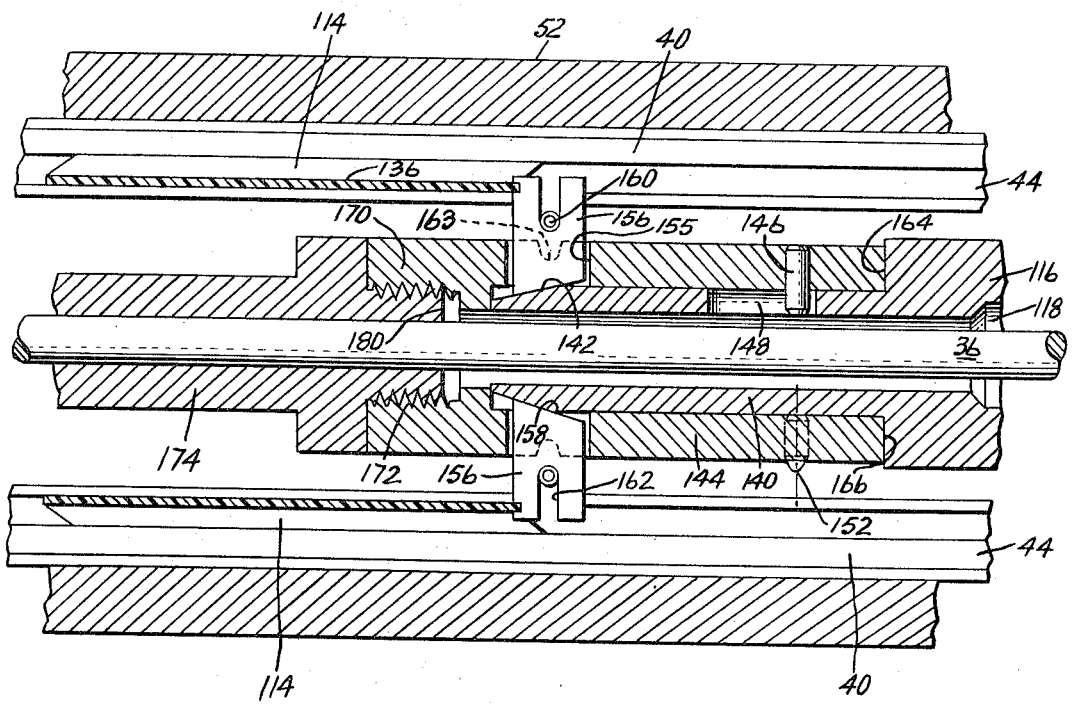
FIG. 7 is a fragmentary, enlarged, longitudinal-sectional view showing the forward pushing elements in their protracted positions.

When sleeve member 116 is in its rearmost position, as shown in FIGS. 1A and 1B, or is being moved rearwardly in the direction shown by arrow 165 so that front portion 140 of sleeve member 116 is retracted with respect to mounting member 144 to provide lost-motion space 150, front wedge pushing elements 156 are biased radially inwardly by spring 160 to their retracted positions in which they are disposed within wedge guide elements 40. When front portion 140 of sleeve member 116 is moved forwardly in direction 138 with respect to mounting member 144 thereby closing the lost-motion space 150, cam surface 142 biases forward wedge pushing elements 156 radially outwardly into wedge guide slots 44, as shown in FIG. 7. Continued forward motion of sleeve member 116 in direct 138 results in abutment of shoulder 164 with rear end 166 of mounting member 144 thereby moving mounting member 144 and forward wedge pushing elements 156 forwardly with sleeve member 116, wedge pushing elements 156 being maintained in their protracted positions extending radially into wedge guide slots 44 by cam surface 142. Front wedge pushing elements 156 respectively have notches 168 formed in their front edges for engaging bottom portions 136 of wedges 114.

Front end portion 170 is secured, as by threaded connection 172, to stripper pushing member 174 slidably mounted on rod 36. Front end 176 (FIG. 1A) of member 174 engages stripper member 32 and pushes the same forwardly through bore 14 and bore 34 of stator core 28 and thereby to insert the coil (not shown) in stator slots 30, as will hereinafter be more fully described. Shoulder 178 on the rear end of rod 36 is engaged by rear end 180 of member 174 thereby to retract rod 36 and stripper member 32, as will hereinafter be described.

In operation, wedge maker 112 is actuated as wedge magazine 86 is indexed by means of ratchet wheel 92 thereby to form wedges 114 in magazine slots 108 at the initial positions shown in FIG. 1B, as more fully described in the aforesaid U.S. Pat. No. 3,447,225. Hydraulic cylinder 128 is then actuated to extend piston rod 126 thereby to move sleeve member 116 and rear pushing member 120 axially forwardly in direction 138 until rear wedge pushing elements 132 reach the positions in wedge guide slots 44 shown at 132a in FIG. 1A, rear wedge pushing elements 132 thus pushing the first group of so-formed wedges 114 forwardly in magazine slots 108 and wedge guide slots 44 to the second or intermediate location shown at 114a in FIG. 1A. During such forward movement of sleeve member 116, rear pushing member 120 and the first group of wedges 114, forward wedge pushing elements 156 are extended into wedge guide slots 44 ahead of the first group of wedges 114 and move forwardly to the position shown in dashed lines at 132b in FIG. 1A, mounting member 144 and pushing member 174 moving forwardly on rod 36, which is received within bore 118 of member 116 (FIG. 7), and 176 of member 174 alternately engaging stripper member 32 and moving the same forwardly through bores 14 and 34.

When piston rod 126 of cylinder 128 has completed its forward stroke thus moving rear wedge pushing elements 132 to their forward position 132a and moving the first group of wedges 114 to their secondary intermediate location 114a, cylinder 128 is actuated to retract piston rod 126 thereby returning sleeve member 116, rear wedge pushing member 120, mounting member 144 and front pushing elements 156 to their rearmost positions as shown in FIGS. 1A and 1B. Initial rearward movement of sleeve member 116 from its forwardmost position results in limited lost-motion of front portion 140 with respect to mounting member 144 so that garter spring 160 moves front pushing elements 156 radially inwardly to their retracted postions, front pushing elements 156 being retained in their retracted positions during continued rearward movement of sleeve member 116 in direction 164 and thereby passing under the first group of wedges previously moved to location 114a in wedge guide slots 44 during the first stroke of piston 126.

Upon return of piston 126, sleeve 116, rear wedge pushing member 120, mounting member 144 and front pushing elements 156 to their rearmost positions, a second group of wedges 114 is formed in magazine slots 108, as above described. Cylinder 128 is then actuated again to extend piston rod 126 to move sleeve member 116 and rear wedge pushing member 120 forwardly in direction 138 thereby to move the second group of wedges 114 forwardly from their initial location, as shown in FIG. 1B, through magazine slots 108 to the second or intermediate location 114a in wedge guide slots 44, as above described. The initial lost-motion relative movement between front portion 140 of sleeve member 116 and mounting member 144 causes cam surface 142 to move front wedge pushing elements 156 radially outwardly to their protracted postions within wedge guide slots 44. Front wedge pushing elements 156 are retained in their retracted positions upon further forward movement of sleeve member 116, as above described. Thus, upon further forward movement of sleeve member 116 in direction 138, front wedge pushing elements 156 engage the first group of wedges 114 at the second or intermediate location 114a and push those wedges forwardly through wedge guide slots 44 into stator core 30 simultaneously with rear wedge pushing elements 132 pushing the second group of wedges 114 to location 114a.

When the first group of wedges have been so pushed forwardly to the position shown in dashed lines at 114b in FIG. 1A, front end 176 of pushing member 174 engages stripping member 32 and pushes the same forwardly and through guide element bore 14 and stator core 34, movable guide elements 12a also moving forwardly as shown in dashed lines 12b in FIG. 1A. Piston rod 126 of cylinder 128 reaches the limit of its extension stroke when front wedge pushing elements 132 have reached the position shown in dashed lines at 132b in FIG. 1A thereby pushing the first group of wedges 114 completely into stator slots 30 over the sides of the coils previously inserted therein by forward movement of stripper member 32. Cylinder 128 is then again actuated to retract piston rod 126 which moves sleeve member 116, rear wedge pushing member 120, mounting member 144 and front pushing elements 156 rearwardly, as above described, front pushing elements 156 being retracted to pass under the second group of wedges 114 at position 114a, also as above described. When rear end 180 of pushing member 174 reaches shoulder 178 on rod 36, rod 36 and stripping member 32 are moved rearwardly by further rearward movement of sleeve member 116.

It will now be seen that in accordance with the invention, dynamoelectric coil and wedge inserting apparatus is provided wherein the slot wedges are transferred from the magazine and inserted in the stator core slots by a two-stroke operation rather than by a single stroke as in prior apparatus, thus permitting shortening the length of cylinder 128 by approximately one-half and, in turn, substantially reducing machine cycle time and the overall length of the machine and its floor space requirement, and also reducing the cost of the machine by reason of the employment of a much shorter-stroke cylinder. It will further be seen that the invention eliminates the prior easily damaged assembly of elongated wedge pushing rods and the apparatus to support and guide them.

However, an alternative single stroke embodiment (not shown) of this invention employs the same structure which eliminates the aforementioned elongated wedge pushing rods and associated supporting and guiding apparatus, this same structure including the rear pushing member 120, pushing elements 132 and magazine 86, but omitting the lost-motion connection 146, 148 and the assembly which includes the forward wedge pushing elements 156. The tubular sleeve member 116 is directly secured to pushing member 174 by, for example, threading or welding front end 176 to front end portion 140. The wedge guide slots are all aligned as described, and the power cylinder 128 is selected to provide double the stroke length previously described. The operation is the same as for the two-stroke embodiment except only a single stroke of the pushing elements 132 is used in pushing the wedges 114 into the stator slots starting from the rearmost position of the pushing elements 132.

This second embodiment is particularly useful for inserting wedges in stators of shorter length than the stators used in connection with the two-stroke machine without requiring the elongated wedge pushing rods and associated apparatus of the prior art.

While there have been described above the principles of this invention in connection with specific apparatus, it is to be clearly understood that this description is made only by way of example and not as a limitation to the scope of the invention.

What is claimed is:

1. In apparatus for inserting prewound coils and slot wedges into the slots of an internally slotted dynamoelectric machine stator core member, said apparatus including a plurality of elongated, axially extending parallel blade elements defining a bore having an axis and having outer surfaces, said blade elements being spaced about said bore and defining radially and axially extending spaces therebetween, said blade elements having distal ends and rear portions, the outer surfaces of said distal ends being adapted to engage the inner ends of the teeth of a stator core member which define said slots with the spaces between said blade elements being in axial alignment with and communicating with respective slots, a plurality of elongated, axially extending, parallel slot wedge guide elements respectively in axial and radial alignment with said blade elements and defining first wedge guide slots therebetween respectively in axial and radial alignment with said blade element spaces and in axial alignment with said stator core member slots, said guide elements respectively abutting the outer surfaces of the rear portions of said blade elements and having forward ends which are spaced rearwardly from said distal ends of said blade elements and also having rear portions, a coil stripper member mounted for axial movement in said bore, first means for moving said stripper member axially through said bore within said blade elements, means extending rearwardly from said rear portions of said wedge guide members for receiving slot wedges and having a plurality of elongated, axially extending, second wedge guide slots formed therein adapted respectively to receive slot wedges at a first location, said second wedge guide slots being respectively in axial alignment with said first wedge guide slots and communicating therewith, and means for pushing said slot wedges axially forwardly toward said distal ends of said blade elements from said first location through said first and second wedge guide slots and into said core member slots; the improvement wherein said pushing means comprises first means for pushing said slot wedges forwardly from said first location through said second wedge guide slots to a second location in said first wedge guide slots spaced rearwardly from said forward ends of said wedge guide elements, second means spaced axially forwardly from said first pushing means for pushing said slot wedges forwardly from said second location through said first wedge guide slots and into said stator core slots, and second means for moving said first and second pushing means forwardly simultaneously whereby a first group of slot wedges are pushed from said second location into said stator core slots as a second group of slot wedges are pushed from said first location to said second location.

2. The apparatus of claim 1 wherein said rear portions of said wedge guide elements are spaced about an extension of said bore, said first wedge guide slots communicating with said bore extension, said second pushing means being axially movable by said second moving means between a first position spaced rearwardly from said second location and a second position adjacent said forward ends of said wedge guide members, said second pushing means including a plurality of pushing elements and means for mounting said pushing elements for radial movement between retracted positions within said bore extension and protracted positions extending respectively radially outwardly into said first wedge guide slots, said second moving means including first means for actuating said pushing elements to said protracted positions thereof in response to forward movement of said second moving means whereby said pushing elements respectively engage said slot wedges at said second location and push the same forwardly, and second means for actuating said pushing elements to said retracted positions thereof in response to rearward movement of said second moving means whereby said pushing elements move rearwardly under said second group of slot wedges at said second location.

3. The apparatus of claim 2 wherein said first actuating means comprises means for providing a lost-motion connection between said second moving means and mounting means which permits limited forward and rearward movement of said second moving means with respect to said mounting means and thereafter moves said mounting means and pushing elements with said second moving means, cooperating cam means on said second moving means and pushing elements for biasing pushing elements to said protracted positions in response to said limited forward movement of said second moving means, said second actuating means comprising resilient means acting on said pushing elements and biasing the same to said retracted positions in response to said limited rearward movement of said second moving means.

4. The apparatus of claim 3 wherein said first moving means comprises an elongated rod member extending coaxially rearwardly within said bore and bore extension, said mounting means being slidably mounted on said rod member, said mounting means including a portion which engages said stripper member when said second moving member has moved said second pushing means forwardly to a third position intermediate said first and second positions and which thereafter moves said stripper member forwardly in said bore in response to further forward movement of said second moving means.

5. The apparatus of claim 4 wherein said second moving means comprises an elongated hollow sleeve member which coaxially receives said rod member when said second pushing means is moved forwardly from said first position thereof, said sleeve member having a forward end, said cam means comprising a cam surface on said forward end.

6. The apparatus of claim 5 wherein said receiving means defines a second bore coaxial with said first-named bore, said sleeve member extending through said second bore and having a rear end, said second wedge guide slots communicating with said second bore, said first pushing means comprising a member secured to said rear end of said sleeve member for axial movement in said second bore and having a second plurality of pushing elements thereon extending radially outwardly into said second wedge guide slots for engaging said slot wedges thereby to push the same forwardly upon forward movement of said sleeve member.

7. The apparatus of claim 6 wherein said receiving means is a slot wedge magazine member, and further comprising means for mounting said magazine member for rotation about said axis, and power means operatively coupled to said sleeve member for moving the same.

8. The apparatus of claim 1 wherein said receiving means defines a second bore coaxial with said first-named bore, said second moving means extending through said second bore, said second wedge guide slots communicating with said second bore, said first pushing means including a plurality of pushing elements extending radially outwardly from said second bore into said second wedge guide slots for engaging said slot wedges to push the same forwardly upon forward movement of said second moving means.

9. The apparatus of claim 8 wherein said first pushing means further includes a member secured to said second moving means for axial movement in said second bore and having said pushing elements extending radially outwardly therefrom, and further comprising power means acting on said second moving means for axially moving the same and said first and second pushing means.

10. The apparatus of claim 8 wherein said second moving means comprises an axially elongated operating member coaxial with said second bore and having a forward end with an annular cam surface formed thereon, said first wedge guide slots communicating with said first-named bore, said second pushing means comprising a mounting member slidably mounted on said forward end of said operating member, means for providing limited forward and rearward lost-motion movement of said operating member with respect to said mounting member and for thereafter moving said mounting member axially with said operating member upon further movement thereof, said mounting member having a plurality of radially extending slots formed therein communicating with said cam surface, a plurality of pushing elements respectively movably seated in said mounting member slots and having radially inner ends engaging said cam surface, said pushing elements having retracted positions with the radially outer ends thereof within said wedge guide members and protracted positions with said outer ends extending into said first wedge guide slots, said pushing elements being biased outwardly to said protracted positions thereof by said cam surface in response to said lost-motion forward movement of said operating member and being retained in said protracted positions by said cam surface during further forward movement of said operating member whereby said outer ends engage said slot wedges and move the same forwardly from said second location upon said further forward movement.

11. The apparatus of claim 10 wherein said outer ends of said pushing elements respectively have grooves formed therein, and further comprising a garter spring seated in said grooves for biasing said pushing elements inwardly to said retracted positions thereof in response to said lost-motion rearward movement of said operating member and for retaining said pushing elements in said retracted positions during further rearward movement of said operating member.

12. In apparatus for inserting prewound coils and slot wedges into the slots of an internally slotted dynamoelectric machine stator core member, said apparatus including a plurality of elongated, axially extending parallel blade elements defining a bore having an axis and having outer surfaces, said blade elements being spaced about said bore and defining radially and axially extending spaces therebetween, said blade elements having distal ends and rear portions, the outer surfaces of said distal ends being adapted to engage the inner ends of the teeth of a stator core member which define said slots with the spaces between said blade elements being in axial alignment with and communicating with respective slots, a plurality of elongated, axially extending, parallel slot wedge guide elements respectively in axial and radial alignment with said blade elements and defining first wedge guide slots therebetween respectively in axial and radial alignment with said blade element spaces and in axial alignment with said stator core member slots, said guide elements respectively abutting the outer surfaces of the rear portions of said blade elements and having forward ends which are spaced rearwardly from said distal ends of said blade elements and also having rear portions, a coil stripper member mounted for axial movement in said bore, first means for moving said stripper member axially through said bore within said blade elements, means extending rearwardly from said rear portions of said wedge guide members for receiving slot wedges and having a plurality of elongated, axially extending, second wedge guide slots formed therein adapted respectively to receive slot wedges at a first location, said second wedge guide slots being respectively in axial alignment with said first wedge guide slots and communicating therewith, and means for pushing said slot wedges axially forwardly toward said distal ends of said blade elements from said first location through said first and second wedge guide slots and into said core member slots; the improvement wherein said pushing means comprises means for pushing said slot wedges forwardly from said first location through said second wedge guide slots and said first wedge guide slots into said stator core slots.

13. The apparatus of claim 12 wherein said pushing means comprises a supporting member mounted for movement in parallelism with said wedge guide slots, a plurality of pushing elements on said supporting member extending radially outwardly into said wedge guide slots to push the same forwardly upon forward movement of said supporting member.

14. The apparatus of claim 13 wherein said first moving means includes an elongated rod member extending coaxially rearwardly within said bore and extension thereof, an elongated hollow sleeve which coaxially receives said rod member when said pushing means is moved forwardly from the rearmost position thereof, said supporting member being mounted on said hollow sleeve and movable therewith.

15. The apparatus of claim 12 wherein the rear portions of said wedge guide elements are spaced about an extension of said bore, said first wedge guide slots communicating with said bore extension.

16. The apparatus of claim 15 wherein said receiving means defines a second bore coaxial with said first-named bore, said second wedge guide slots communicating with said second bore, said first pushing means comprising a member secured to said rear end of said sleeve member for axial movement in said second bore and having a second plurality of pushing elements thereon extending radially outwardly into said second wedge guide slots for engaging said slot wedges thereby to push the same forwardly upon forward movement of said sleeve member.

17. The apparatus of claim 16 wherein said receiving means is a slot wedge magazine member, and further comprising means for mounting said magazine member for rotation about said axis, and power means operatively coupled to said sleeve member for moving the same.

* * * * *